Dec. 14, 1948.   J. E. MOGAN   2,456,303
CLOTHES RACK FOR AUTOMOBILES
Filed Oct. 20, 1947
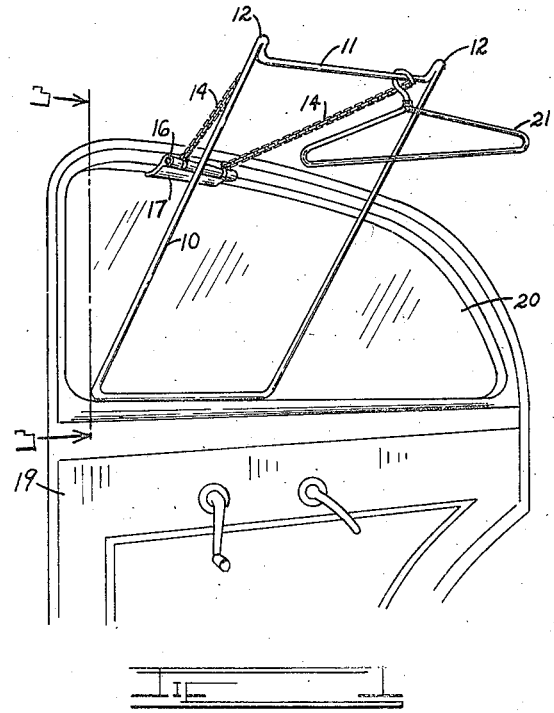
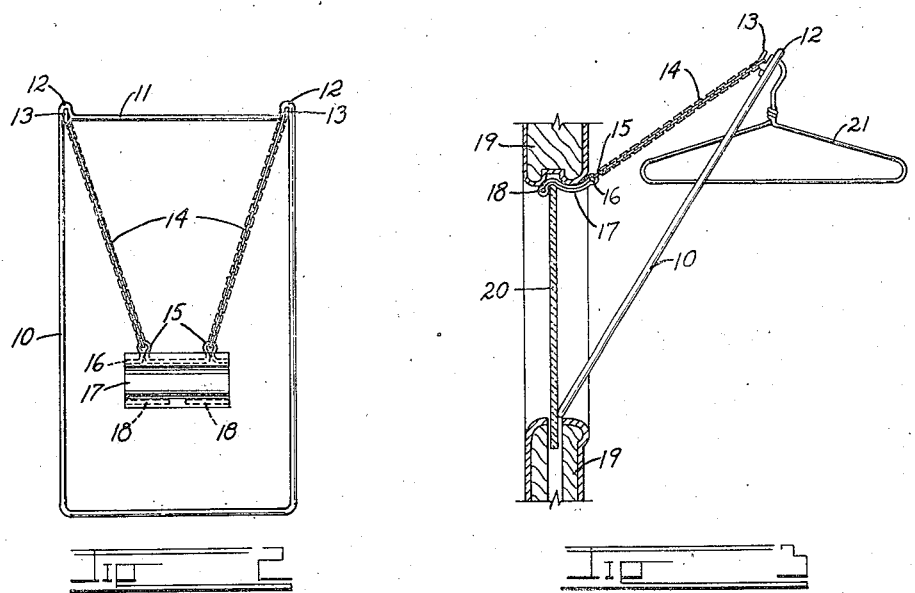
Inventor
JAMES E. MOGAN
By
Attorney Patented Dec. 14, 1948

2,456,303

UNITED STATES PATENT OFFICE 2,456,303

CLOTHES RACK FOR AUTOMOBILES

James E. Mogan, Denver, Colo.

Application October 20, 1947, Serial No. 780,883

5 Claims. (Cl. 224—29)

This invention relates to a device for hanging garments in an automobile, and has for its principal object the provision of a light, simple, and economical device which can be applied to the interior of the automobile without the use of tools of any kind; which will not damage the automobile in any way; and which will support a plurality of garment hangers at one side of the car and adjacent the top thereof.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view, illustrating the invention in place on the inside of a typical automobile door;

Fig. 2 illustrates the complete garment hanging device detached from the automobile; and Fig. 3 is a section taken on the line 3—3, Fig. 1, illustrating a side view of the improved hanger in place in the automobile.

The invention consists of a rectangular frame 10 preferably formed from round metal rod welded together at its extremities so as to be endless. The frame 10 could, of course, be formed from other materials, such as wood or plastic, if desired.

The frame is of greater height than width, and the height thereof is estimated to place the upper extremity of the frame adjacent the top of an automobile when the lower extremity is resting on the window sill of the door of the automobile.

The top of the frame 10 contains a depressed hanger bar 11, the extremities of which are bent upwardly, thence downwardly to form the side members of the frame. The upwardly bent portions, indicated at 12, form abutments to prevent garment hangers from slipping from the bar 11.

Two chain attachment clips 13 are welded or otherwise secured to the frame in the upwardly-turned extremities 12 to receive supporting chains 14. The other extremities of the chain 14 are secured in eyelets 15 formed in a chain rod 16.

The chain rod is stitched or otherwise imbedded in a flexible pad 17 formed of leather, fabric, or other suitable material. Stiffening dowels 18 are stitched in or imbedded in the pad 17 along the opposite edge thereof.

In Figs. 1 and 3 the device is illustrated in place in an automobile door 19 having a window frame with a vertically slidable glass pane 20. The device is applied to the door by resting the bottom of the rectangular frame on the window frame and against the pane 20. The pad 17 is then placed over the upper edge of the pane 20 and the latter is elevated to force the pad against the top of the window frame and partially into the glass-receiving groove, with which such frames are provided, as shown in Figs. 1 and 3.

The stiffening dowels 18 engage the upper edge of the glass pane and prevent the pad 17 from being pulled inwardly. The length of the frame 10 is such as to place the hanging bar 11 a considerable distance above the glass pane 20 and adjacent the top of the car for supporting garment hangers such as illustrated at 21.

The device can be completely detached from the car by simply lowering the glass pane 20, or it can be lifted from the window frame and allowed to hang against the inside face of the door 19 when not in use.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A garment-supporting device for automobiles having an elevatable glass pane mounted in a surrounding window frame, comprising: an open rigid frame adapted to rest at its lower extremity on said window frame against said plane; a hanger extending horizontally across the upper extremity of said frame; flexible members extending from the upper extremity of said rigid frame; and means on the extremities of said flexible members adapted to engage the upper edge of said glass pane, said flexible members being sufficiently long to support said rigid frame in an inclined position so as to place said hanger bar a substantial distance from the inside of said pane.

2. A garment-supporting device for automobiles having an elevatable glass plane mounted in a surrounding window frame, comprising: an open rigid frame adapted to rest at its lower extremity on said window frame against said pane; a hanger bar extending horizontally across the upper extremity of said frame; flexible members extending from the upper extremity of said rigid frame; and a flexible pad attached to the extremities of said flexible members and adapted to be placed over the upper edge of said pane so as to be forced against said window frame by the upward movement of said pane said flexible members being sufficiently long to support said rigid frame in an inwardly inclined position so as to place said hanger bar a substantial distance from the inside of said window pane.

3. A garment-supporting device for automobiles having an elevatable glass pane mounted in a surrounding window frame, comprising: an open rigid frame adapted to rest at its lower extremity on said window frame against said pane; a hanger bar extending horizontally across the upper extremity of said frame; flexible members extending from the upper extremity of said rigid frame; a flexible pad attached to the extremities of said flexible members and adapted to be placed over the upper edge of said pane so as to be forced against said window frame by the upward movement of said pane said flexible members being sufficiently long to support said rigid frame in an inwardly inclined position so as to place said hanger bar a substantial distance from the inside of said window pane; and a thickened edge portion on said pad to engage said pane and prevent the former from being drawn across the latter.

4. A garment-supporting device for automobiles having an elevatable glass pane mounted in a surrounding window frame, comprising: an open rigid frame adapted to rest at its lower extremity on said window frame against said pane; a hanger bar extending horizontally across the upper extremity of said frame; flexible members extending from the upper extremity of said rigid frame; an attachment bar connecting the free extremities of said flexible members; a flexible pad formed over and surrounding said attachment bar and extending sidewardly therefrom; and dowel members in the edge of said pad opposite to said bar for thickening said edge, said pad being adapted to be placed over the upper edge of said pane to be forced upwardly by elevating the latter said flexible members being sufficiently long to support said rigid frame in an inclined position so as to place said hanger bar a substantial distance from the inside of said pane.

5. A garment-supporting device for automobiles having an elevatable glass pane mounted in a surrounding window frame, comprising: an open rigid frame adapted to rest at its lower extremity on said window frame against said pane; a hanger bar extending horizontally across the upper extremity of said frame; flexible members extending from the upper extremity of said rigid frame; an attachment bar connecting the free extremities of said flexible members; a flexible pad formed over and surrounding said attachment bar and extending sidewardly therefrom; dowel members in the edge of said pad opposite to said bar for thickening said edge, said pad being adapted to be placed over the upper edge of said pane to be forced upwardly by elevating the latter, said flexible members being sufficiently long to support said rigid frame in an inclined position so as to place said hanger bar a substantial distance from the inside of said pane; and raised extremities on said hanger bar acting to retain conventional garment hangers thereon.

JAMES E. MOGAN.

REFERENCES CITED

The following references are of record in the file of this patent:

UNITED STATES PATENTS

| Number | Name | Date |
| --- | --- | --- |
| 351,976 | Hall | Nov. 2, 1886 |
| 1,052,791 | Bilger | Feb. 11, 1913 |
| 2,157,001 | Morley | May 2, 1939 |
| 2,196,341 | Rush | Apr. 9, 1940 |